C. E. DUFFY.
AUTOMOBILE POWER JACK.
APPLICATION FILED OCT. 20, 1917.
1,261,910.
Patented Apr. 9, 1918.
2 SHEETS—SHEET 1.
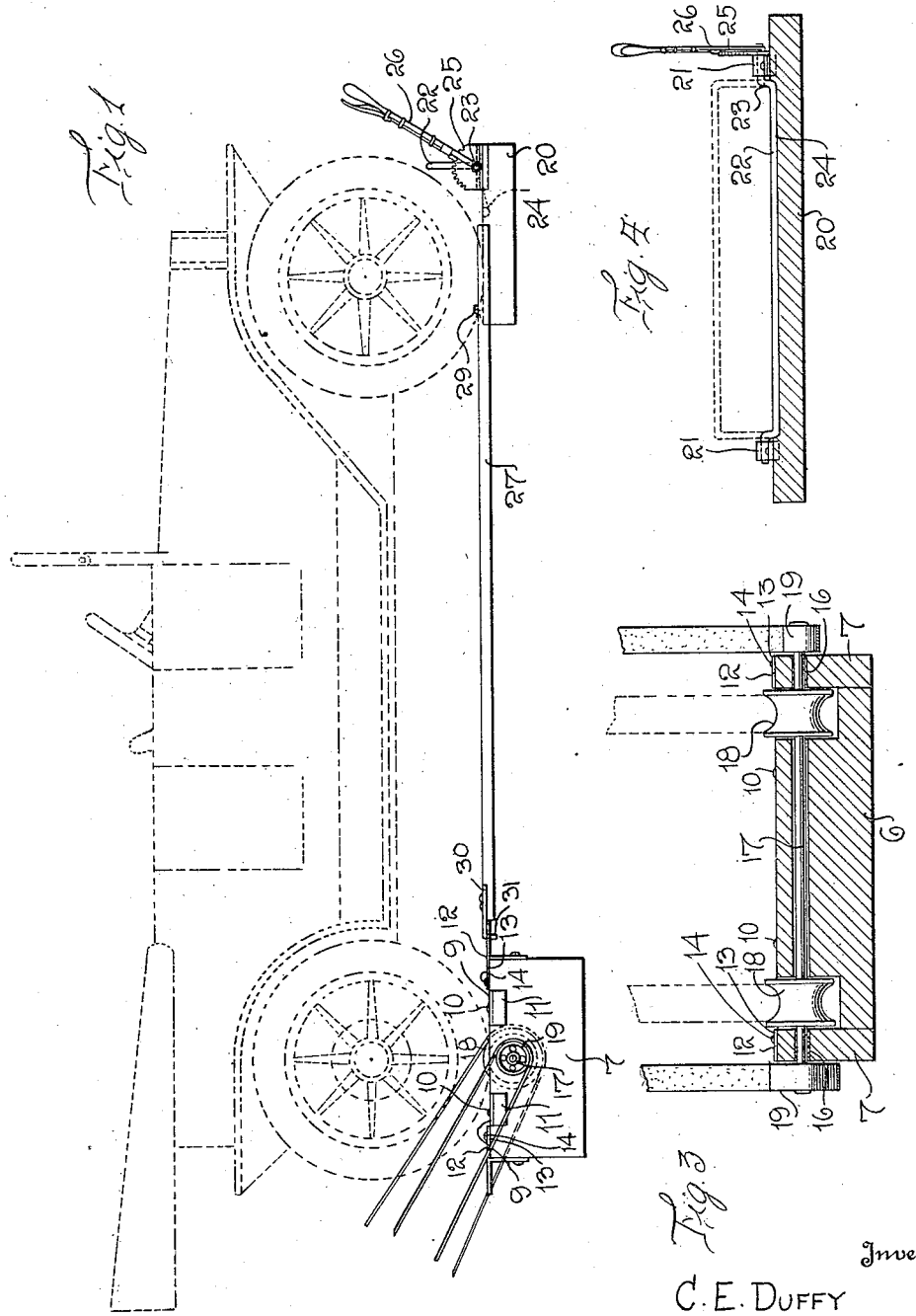
Inventor
C. E. DUFFY
By Watson E. Coleman
Attorney C. E. DUFFY.
AUTOMOBILE POWER JACK.
APPLICATION FILED OCT. 20, 1917.
1,261,910.
Patented Apr. 9, 1918.
2 SHEETS—SHEET 2.
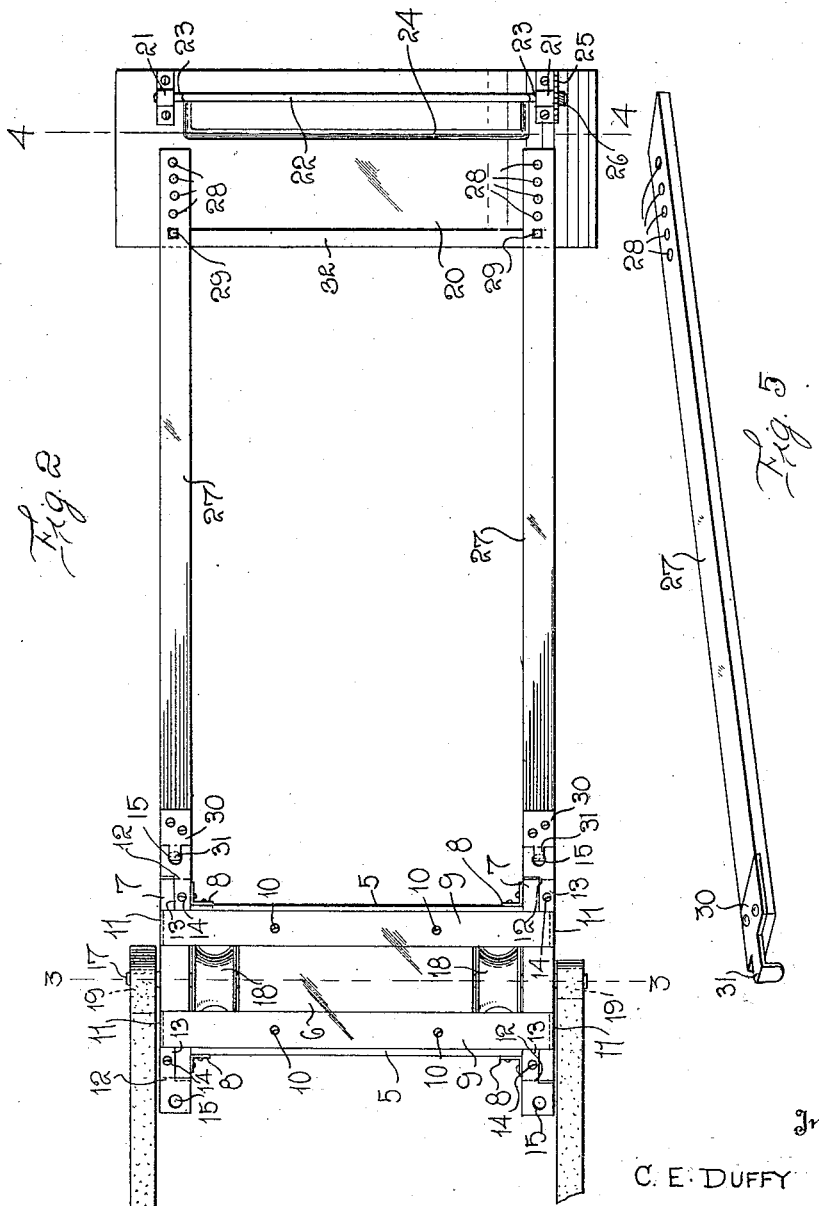
Inventor
C. E. DUFFY
By Watson E. Coleman
Attorney

UNITED STATES PATENT OFFICE.

CLARENCE E. DUFFY, OF PROSSER, WASHINGTON.

AUTOMOBILE POWER-JACK.

1,261,910. Specification of Letters Patent. Patented Apr. 9, 1918.

Application filed October 20, 1917. Serial No. 197,635.

*To all whom it may concern:*

Be it known that I, CLARENCE E. DUFFY, a citizen of the United States, residing at Prosser, in the county of Benton and State of Washington, have invented certain new and useful Improvements in Automobile Power-Jacks, of which the following is a specification, reference being had to the accompanying drawings.

This invention relates to an improved automobile power jack and has for its primary object to provide a very simple and serviceable device whereby power may be transmitted from the rear driving wheels of a motor vehicle for the operation of a pump or other machinery.

It is another object of my invention to provide a suitably mounted power transmission shaft having wheels fixed thereon frictionally engaged by the driving wheels of the vehicle, and means for preventing the forward movement of the front vehicle wheels.

It is also another object of the invention to provide an automobile power jack which may be readily mounted upon a garage floor or in the ground surface, and the several parts of which can be easily and quickly assembled or disassembled.

With the above and other objects in view, my invention consists in the novel features of construction, combination, and arrangement of parts to be hereinafter more fully described, claimed, and illustrated in the accompanying drawing, in which, Figure 1 is a side elevation illustrating the preferred embodiment of my improved power jack;

Fig. 2 is a top plan view;

Fig. 3 is a section taken on the line 3—3 of Fig. 2;

Fig. 4 is a section through the front wheel base, showing the stop rod lowered; and Fig. 5 is a detail perspective view of one of the connecting bars between the front wheel base and the body of the jack.

Referring in detail to the drawings, 5 designates spaced, parallel bars between which a spacing block 6 is arranged and suitably secured. Bars 7 connect the spaced bars 5 at their opposite ends, and angular bracing and reinforcing plates 8 are securely fixed to the inner faces of these end bars and the bars 5.

The upper face of the spacing block 6 is recessed or mortised along its opposite longitudinal edges, and the upper edges of the side bars 5 are similarly mortised to receive the reinforcing metal straps 9 which are secured to the spacing block 6 by means of the screws or bolts 10. The ends of these metal straps are angularly bent, as at 11, and engaged in mortises in the outer faces of the end bars 7. To the opposite ends of the bars 7, at their upper edges, laterally projecting plates 12 are arranged and provided with flanges or extensions 13 secured to the bars 7 by means of the screws 14. Each of these plates is provided with an opening indicated at 15, the purpose of which will be presently stated.

In each of the bars 7, suitable bearings 16 are secured for the power transmission shaft 17. This shaft extends through a longitudinal bore or opening in the spacing block 6. Peripherally grooved wheels 18 are fixed upon said shaft and located in the recessed ends of the block 6 contiguous to the inner side faces of the end bars 7. Upon the opposite ends of the shaft 17, pulleys or belt wheels 19 of relatively different diameter are secured.

20 designates the front wheel base which consists of a bar of suitable width and thickness, and in bearings 21 on the opposite ends of this bar, the crank arms 23 on the ends of a rod 22 are rotatably engaged. The bar 20 is provided in its upper surface with a groove or channel 24 adapted to receive the rod 22 so that said rod may be disposed flush with the upper surface of the bar. 25 designates a fixed tooth or quadrant with which a locking dog, carried by a lever 26 fixed to one of the terminals of the rod 22, is adapted to be operatively engaged.

Bars 27 are provided in one of their ends with spaced openings 28 for adjustable connection to the base bar 20 by means of the bolts 29. To the other end of each of said bars, a plate 30 is fixed, said plate having an angular lug 31 disposed in spaced relation to the end of the bar. These lugs are adapted for engagement through the openings 15 in the plates 12 projecting from one side of the jack base or body. To the upper surface of the base bar 20 along the longitudinal edge thereof, between the ends of the bars 27, a chamfered cleat 32 is securely fixed.

In the use of my invention, the jack base and the front wheel base 20 are adapted to be arranged in the floor or ground surface so that the upper surface of the base 20 will be substantially in the same plane with the surface of the jack base, the hooks or lugs 31 being connected to one pair of the plates 12 as above stated. By also providing the plates 12 projecting from the opposite side of the jack base, the wheel base 20 can be connected to either side thereof so that the machine may be driven from either direction into position upon the jack. The openings in the other pair of plates 12 receive suitable anchoring rods or pins. When the machine is driven into position with its front wheels resting upon the base 20 and its rear wheels on the grooved wheels 18, the lever 26 is actuated to raise the medial portion of the rod 22 in advance of the front wheels of the machine so as to prevent the front wheels moving off of the base 20. Thus, when the motor is started, it will be manifest that the rear driving wheels of the machine will transmit rotation to the shaft 17, and through belt connections to the pulleys on the ends of this shaft, the power may be transmitted to various machines which it is desired to operate. In order to remove the machine from the jack, the lever 26 is operated to lower the rod 22 into the groove or channel 24 in the base bar 20, so that the front wheels of the machine may move forwardly off of said bar.

From the foregoing description, taken in connection with the accompanying drawing, the construction, manner of operation and several advantages of my invention will be clearly understood. The several parts of the device may be readily assembled in operative position either in a garage floor or in the ground surface and the motor vehicle may be easily and quickly driven to its proper operative position thereon. The vehicle is properly retained in this position and held against any possibility of forward movement, so that there will be a continuous transmission of power in the operation of the motor, to the shaft 17. The several parts of the invention are quite simple in form as well as durable in their construction. It will further be apparent that a power jack such as I have above described can be produced at relatively small manufacturing cost.

While I have herein shown and described the preferred construction and relative arrangement of the several parts, it is to be understood that I reserve the privilege of resorting to all such legitimate changes as may be fairly embodied within the spirit and scope of the invention as claimed.

Having thus fully described my invention, what I desire to claim and secure by Letters Patent is:

1. A power jack for motor vehicles including a jack base, a shaft mounted therein, wheels fixed on said shaft, belt wheels secured on opposite ends of the shaft, in combination with a base bar upon which the front wheels of the vehicle are adapted to engage, and manually adjustable means on said bar to prevent forward movement of the front wheels and maintain the rear driving wheels of the vehicle in position upon the first named wheels on said shaft.

2. A power jack for motor vehicles including a jack base, a shaft mounted therein, wheels fixed on said shaft, belt wheels secured on opposite ends of the shaft, in combination with a base bar upon which the front wheels of the vehicle are adapted to engage, a rod having cranks on its opposite ends mounted upon said base bar, and a lever fixed on one of said cranks to raise the rod in advance of the front wheels of the vehicle to prevent movement of said wheels off of said base bar and maintain the rear driving wheels of the vehicle in engagement with the first named wheels on said shaft.

3. A power jack for motor vehicles including a jack base, a shaft mounted therein, wheels fixed on said shaft, belt wheels secured on opposite ends of the shaft, in combination with a base bar upon which the front wheels of the vehicle are adapted to engage, a rod having cranks on its opposite ends mounted upon said base bar, and a lever fixed on one of said cranks to raise the rod in advance of the front wheels of the vehicle to prevent movement of said wheels off of said base bar and maintain the rear driving wheels of the vehicle in engagement with the first named wheels on said shaft, said base bar being provided in its upper face with a channel or groove adapted to receive said rod to dispose the rod flush with the upper face of the base bar and permit of the forward movement of the vehicle wheels.

4. A power jack for motor vehicles including a jack base, a shaft mounted therein, wheels fixed on said shaft, belt wheels secured on opposite ends of the shaft, in combination with a base bar upon which the front wheels of the vehicle are adapted to engage, a rod having cranks on its opposite ends mounted upon said base bar, a lever fixed on one of said cranks to raise the rod in advance of the front wheels of the vehicle to prevent movement of said wheels off of said base bar and maintain the rear driving wheels of the vehicle in engagement with the first named wheels on said shaft, said base bar being provided in its upper face with a channel or groove adapted to receive said rod to dispose the rod flush with the upper face of the base bar and permit of the forward movement of the vehicle wheels, and adjustable connections between said base bar for the front vehicle wheels and the jack base.

5. A power jack for motor vehicles including a jack base, a shaft mounted therein, wheels fixed on said shaft, belt wheels secured on opposite ends of the shaft, in combination with a base bar upon which the front wheels of the vehicle are adapted to engage, a rod having cranks on its opposite ends mounted upon said base bar, a lever fixed on one of said cranks to raise the rod in advance of the front wheels of the vehicle to prevent movement of said wheels off of said base bar and maintain the rear driving wheels of the vehicle in engagement with the first named wheels on said shaft, said base bar being provided in its upper face with a channel or groove adapted to receive said rod to dispose the rod flush with the upper face of the base bar and permit of the forward movement of the vehicle wheels, apertured plates secured upon the opposite ends of the jack base, bars each having means on one end for detachable engagement with said apertured plates, and means for adjustably connecting said bars at their other ends to the base bar for the front vehicle wheels.

In testimony whereof I hereunto affix my signature in the presence of two witnesses.

CLARENCE E. DUFFY.

Witnesses:
 HARLEY R. TUCKER,
 S. E. LYNN.

Copies of this patent may be obtained for five cents each, by addressing the "Commissioner of Patents, Washington, D. C."